July 7, 1964   E. J. BIRKENBACH ETAL   3,139,942
HARROW WITH TOOTH SET ANGLING DEVICE
Filed March 26, 1962   2 Sheets-Sheet 1

Inventors:
Eugen J. Birkenbach
Robert R. Molycka
Paul O. Pippel
Atty.

July 7, 1964 E. J. BIRKENBACH ETAL 3,139,942
HARROW WITH TOOTH SET ANGLING DEVICE
Filed March 26, 1962 2 Sheets-Sheet 2
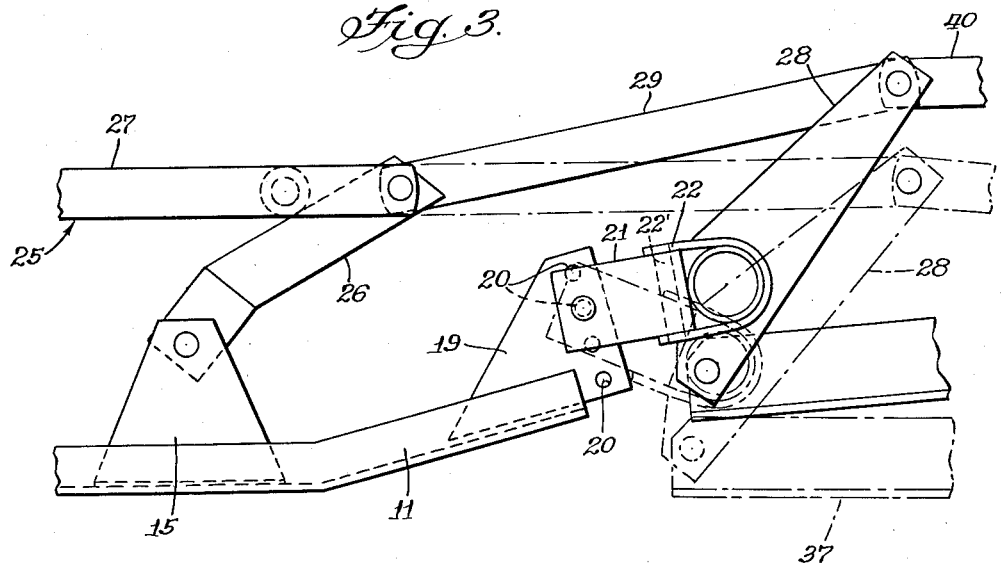
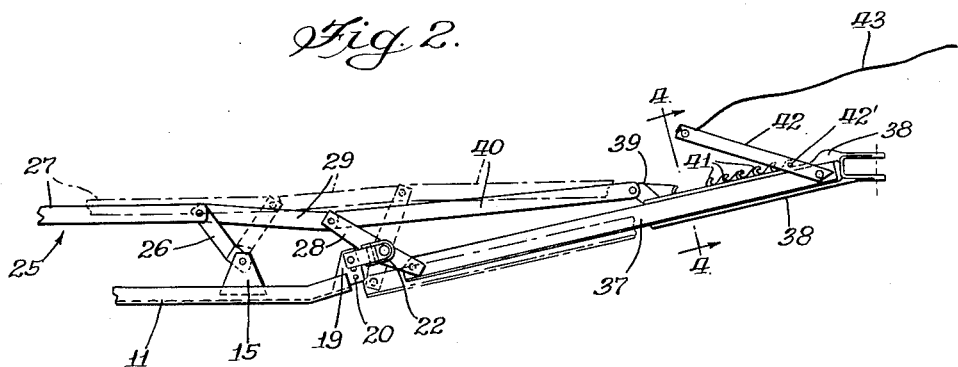
Inventors:
Eugen J. Birkenbach
Robert R. Motycka

United States Patent Office 3,139,942
Patented July 7, 1964

3,139,942
HARROW WITH TOOTH SET ANGLING DEVICE
Eugen J. Birkenbach, Park Ridge, and Robert R. Motycka, Brookfield, Ill., assignors to International Harvester Company, Chicago, Ill., a corporation of New Jersey
Filed Mar. 26, 1962, Ser. No. 182,345
2 Claims. (Cl. 172—390)

The present invention relates to agricultural implements and more specifically to harrows.

One of the most critical problems which has confronted designers of harrows has been the provision of a machine which will uniformly penetrate the earth under conditions of varying soil resistance. Prior art devices have not satisfactorily solved this problem, and have generally exhibited a tendency to raise out of the ground under conditions of heavy draft. The general purpose of the present invention is therefore to provide a harrow which embraces all the advantages of similarly employed devices, while being capable of uniformly working the earth. To attain this, the invention contemplates a unique linkage arrangement in the tooth-angling mechanism, whereby the tendency of the harrow to lift out of the ground is avoided.

Another important object of the invention is to provide a harrow with means, integral with the tooth-angling mechanism, which adapt it to be used with drawbars of various heights.

A further object is to provide means associated with the harrow drawbar means for incremental angular adjustment of the harrow teeth.

These and other objects of the invention will hereinafter become more apparent from the specification and drawings wherein:

FIGURE 3 is a view similar to FIGURE 2 showing the operation of the drawbar height compensating link; and FIGURE 4 is a section view along line 4—4 of FIGURE 2.

Figure 1:
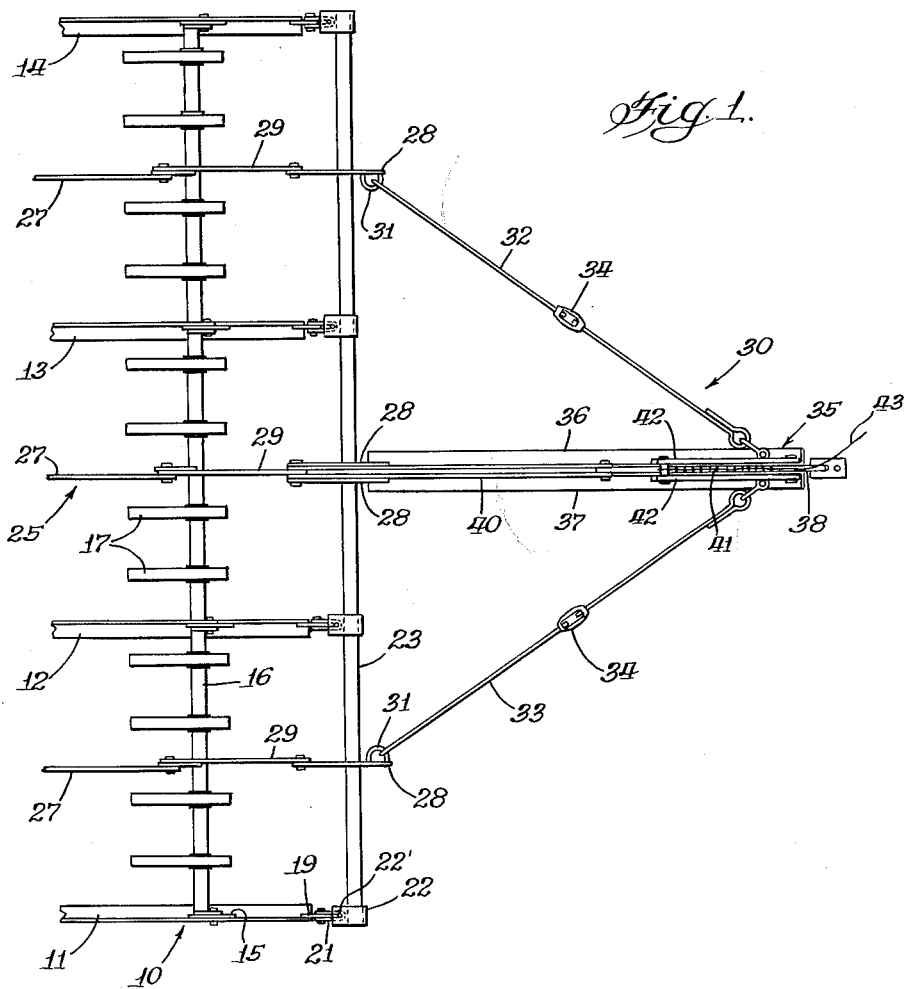
FIGURE 1 is a plan view of a preferred embodiment of the invention.

Referring now more specifically to the drawings, reference numeral 10 indicates the harrow frame in its entirety. The harrow frame consists of a plurality of longitudinally extending and transversely spaced runner bars 11–14, formed of angle iron or the like. Fixedly secured to each runner bar at transversely aligned positions are a plurality of tooth bar standards 15. A plurality of tooth bars 16, only one of which is shown, extend transversely across frame 10 and are rockably mounted on transversely aligned tooth bar standards 15. A plurality of harrow teeth 17 are adjustably secured to each tooth bar 16, as is well known in the art.

A generally vertically extending bracket 19 is fixed to the forward upturned end of each runner bar, each said bracket containing a plurality of vertically spaced apertures 20. Drawbar height compensating links 21 formed of generally U-shaped clamp members, are pivotally secured to corresponding apertures of each bracket 19, so as to be vertically swingable with respect thereto. A second grenerally U-shaped clamp member 22 is secured to each drawbar height compensating link 21, as by having a transversely extending pin 22' engage the closed end of U-shaped link 21. A shaft member 23 extends transversely across the harrow frame generally parallel to tooth bars 16, and is rotatably journaled in said second U-shaped clamps 22.

Set bar means 25 are provided for rocking tooth bars 16 with respect to harrow frame 10. The set bar means includes a plurality of generally vertically extending set bar standards 26 fixedly secured to tooth bars 16 at points intermediate said runner bars. Longitudinally extending set bars 27 are pivotally secured to the upper ends of set bar standards 26. A plurality of generally vertically extending arms 28 are fixedly secured at their central portion to shaft 23, at spaced positions therealong. In the embodiment illustrated in FIGURE 1, a single arm is provided between runner bars 11–12, and 13–14, and a pair of arms are provided at the central portion of the harrow frame between runner bars 12 and 13, each of said arms being substantially aligned with said set bars 27. Connecting straps 29 are pivotally secured at one end to the forward end of set bars 27, and at the other end to the upper ends of arms 28.

Drawbar means generally indicated by reference numeral 30 are provided for securing harrow frame 10 to a tractor, not shown, and for actuating said set bar means so as to continuously urge said harrow teeth into ground engaging position. It will be noted from an examination of FIGURE 1 that the two outermost vertically extending arms 28 are provided at their lower portions with U-bolts 31. Drawbar cables 32 and 33 are secured at one end to U-bolts 31 and at the other end to a tongue member 35. Turnbuckle means 34 are provided at points intermediate the ends of cables 32 and 33 for tightening them. Tongue member 35 consists of two longitudinally extending channel shaped members 36 and 37 pivotally secured at one end to the lower end of the centrally spaced pair of vertically extending arms 28. Channel members 36 and 37 are slidably mounted in a generally I-shaped draft head 38. A vertically extending plate 39 is mounted at one end of draft head 38, and has a connecting link 40 pivotably secured thereto. The other end of connecting link 40 is pivotably secured to the upper ends of the centrally disposed pair of vertically extending arms 28. A plurality of forwardly angled, longitudinally spaced ratchet teeth 41 are disposed along draft head 38 forwardly of vertical plate 39. A lock lever 42 is pivotally secured at one end to tongue member 35, and has a part thereon, such as a transversely extending roller pin 42', selectively engageable with ratchet teeth 41 for locking said tongue member with respect to said draft head. Tongue member 35 may be released for sliding movement in draft head 38 by a forward pull on line 43, which is secured to the end of lock lever 42 and extends forwardly where it is manually manipulated by the tractor operator.

Figure 2:
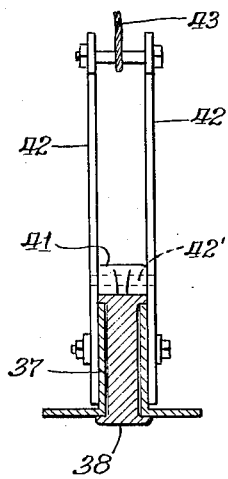
FIGURE 2 is a side elevational view of the harrow illustrated in FIGURE 1 showing the angling mechanism in both working and transport position.

The operation of the device will become more apparent from an examination of FIGURE 2, where the solid lines show the harrow in working position, and broken lines show the harrow in transport position. When it is desired to swing the harrow teeth from transport to working position, the operator first pulls forwardly on line 43 releasing lock lever part 42' from ratchet teeth 41, and enabling tongue member 35 to slide in draft head 38. The operator then backs the tractor, forcing draft head 38 rearward on tongue member 35. Connecting links 40 engage the upper part of vertically extending arms 28, so as to swing them rearward. Set bar means 25 transmit this motion to the tooth bars 16, whereby harrow teeth 17 are swung into ground engaging position. Lock lever part 42' is then re-engaged with ratchet teeth 41, at the desired angular setting of the harrow teeth, securely locking tongue member 35 with respect to draft head 38. When the source of motive power is applied to draft head 38, drawbar cables 32 and 33 and tongue member 35, which are secured to the lower portion of vertically extending arms 28, tend to swing the vertical arms 28 in a counterclockwise direction as shown in FIGURE 2, so as to continuously urge the teeth into ground engaging position. When it is desired to change the depth of penetration of the teeth, or to swing the teeth into transport position, the operator pulls forward on line 43 disengaging part 42′ from ratchet teeth 41, so that when the tractor pulls forwardly on draft head 38, vertically extending arms 28 will be swung in a clockwise direction as viewed in FIGURE 2 lifting teeth 17 from their ground engaging position. Lock lever part 42′ will then be re-engaged with ratchet teeth 41 to lock tongue member 35 with respect to draft head 38.

The operation of vertically swingable drawbar height compensating links 21 will become apparent from an examination of FIGURE 3, where a link 21 is shown in two positions to accommodate drawbars of different heights. It will be noted that regardless of position of link 21, draft means 30 still cooperates with the lower end of vertically extending arm 28, so as to continuously urge harrow teeth 17 into ground engaging position. To provide the proper angular relation of draft means 30, each of links 21 can be secured to any of the corresponding vertically spaced apertures 20.

It will readily be appreciated that the floating connection between harrow frame 10 and drawbar means 30 permits the upper portion of arms 28 to force draft head 38 a given distance in one direction, while the lower portion of arms 28 force tongue member 35 to move a predetermined distance in the opposite direction. Since the amount of movement of tooth bars 16 is governed by the amount of movement of the upper portion of arms 28, and since the relative movement between draft head 38 and tongue member 35 is greater than the movement of the upper portion of arms 28, it will be readily understood that a relatively large adjustment of locking means 41, will produce a relatively small angular adjustment of tooth bars 16. This novel arrangement allows teeth 41 to be formed of a heavy construction and to be widely spaced, while still providing a fine range of adjustment for tooth bars 16.

Operation of the harrow angling mechanism should be clearly understood from the foregoing description. It should likewise be understood that the invention has been described in its preferred embodiment only, and that modifications may be made therein without departing from the spirit of the invention or the scope of the appended claims.

What is claimed is:

1. For use with drawbars, of different heights, a harrow having frame means, at least one transversely extending tooth bar mounted for rocking movement with respect to said frame means, tooth means secured to said tooth bar and adapted to rock with said tooth bar into ground engaging position, set bar means connected to said tooth bar for rocking movement thereof, drawbar means adapted to be connected to a source of motive power, and an articulated connection between said drawbar means and said frame means, comprising longitudinally extending link means pivotally connected at one end to said frame means and means operatively connecting the other end of said link means to the drawbar means for pivoting of the link means relative thereto in a vertical plane to accommodate vertical translational movement of the drawbar means relative to the frame means, said means pivotally connecting the other end of the link means to the drawbar means comprising a transverse shaft rockably mounted in said other end of the link means, a lever secured to said shaft and rockable therewith having a part extending above and a part extending below said shaft, and means pivotally connecting the lower end of the lever to said drawbar means and the upper end thereof to said set bar means.

2. The invention set forth in claim 1, wherein means are provided cooperative between said link means and said frame means for adjusting the vertical position of the link means relative to the frame means.

References Cited in the file of this patent
UNITED STATES PATENTS

| | | |
|---|---|---|
| 580,433 | Strait | Apr. 13, 1897 |
| 1,366,842 | Smith | Jan. 25, 1921 |
| 1,923,930 | Johnson et al. | Aug. 22, 1933 |
| 2,983,321 | Johannsen | May 9, 1961 |